2,997,245
METHOD AND DEVICE FOR PULVERIZING AND/OR DECOMPOSING SOLID MATERIALS

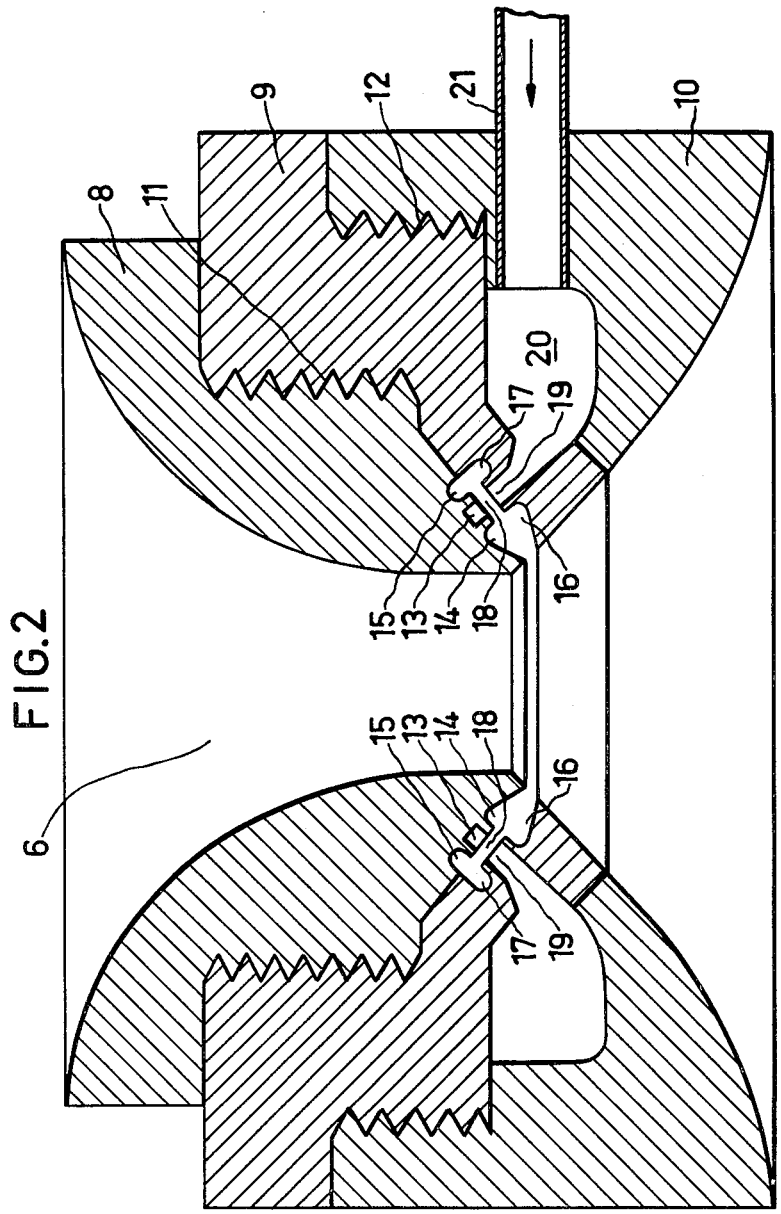

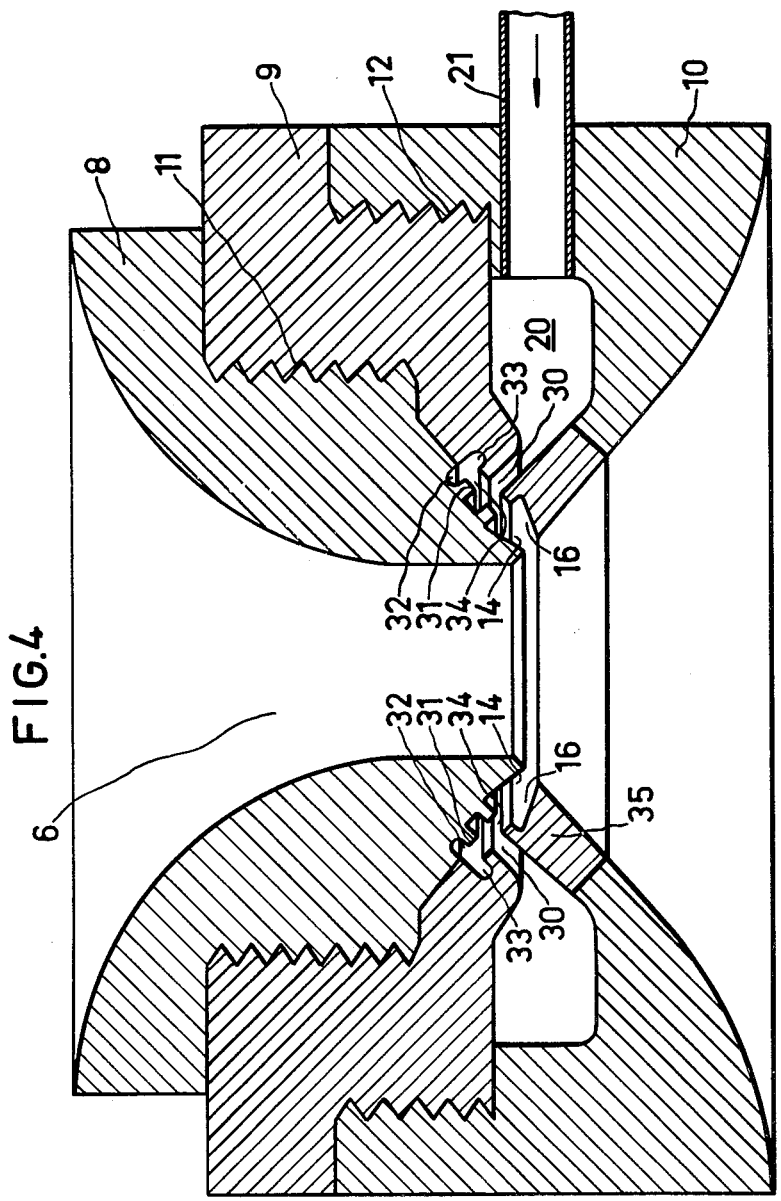

Eric Odel Folke Nilsson, Aby, and Sven Ingemar Nilsson and Erik Gustav Hagelin, Norrkoping, Sweden, assignors to Kohlswa Jernverks Aktiebolag, Kolsva, Sweden, a joint-stock company of Sweden
Filed Jan. 13, 1959, Ser. No. 789,226
Claims priority, application Sweden Jan. 17, 1958
10 Claims. (Cl. 241—1)

Metals and other solid materials were heretofore pulverized by grinding them in mills or similar machines. In some cases a method was used comprising pouring molten metal in one or more fine jets on a rapidly rotating disk to cause the metal to solidify to fine wires or strands, which were then ground to a powder. It has also been proposed to disintegrate a jet of molten metal by blowing air or gas on it.

The powder produced in accordance with the methods heretofore known has, however, disparate sizes of grain, and the pulverization by the methods heretofore known was expensive, and rendered results unsatisfactory for many purposes.

The chief purpose of this invention is to remove such inconveniences and to effect pulverization and/or decomposition very efficiently and at low costs, while achieving a good, uniform result also when reduction to very small grains (particles) is made.

Another purpose of this invention is to produce a very fine and uniform powder in a continuous process.

Another purpose of this invention is to pulverize or decompose solid material by means of non-stationary shock waves generated in a gaseous medium.

Another purpose of this invention is to pulverize solid materials in a device without any movable mechanical parts.

Other purposes will be evident from the following specification and claims.

In this specification the expression "solid materials" refers to materials which are solid at ordinary room temperature. Although the pulverizing process may be applied to such material in its molten state the powder attained is always solid.

As an example, it might be mentioned that powder of a particle size of 0.5 to 2 microns may be produced in accordance with the invention, there being no particles of bigger size among them. Also powders of other particle sizes may be produced in accordance with this invention.

Powders in which the size of the particles is very small are very useful for many purposes, for instance, as pigment in paints, for certain metallurgical processes on a powder base etc. The invention may also be used for disintegrating or decomposing organic and inorganic materials, that is for breaking up cells, incrustations and the like therein.

The invention relates both to a method and a device for carrying out such method.

Ultrasonic sound or audio waves (ultrasonics) which propagate at the same speed as sound and have a linear character, have a small amplitude and a low quantity (density) of energy, and the transfer of energy from ultrasonic waves to solid bodies is furthermore very low; this also applies to the transfer of energy to (a jet of) molten metal. Inter alia, this low transfer is due to the fact that the ultrasonic wave is highly reflected at the surface of the solid body.

On the contrary, shock waves in accordance with this invention have a non-linear character, are non-stationary with a movable wave front and have very big amplitudes and a great density of energy. By use of the method according to this invention, the non-stationary shock waves are reflected to a small degree only and thus they enter the solid material, the transfer of energy from the shock waves to the solid material is very efficient and if the material is molten (or heated to a plastic consistence) the transfer of energy is increased still more.

The shock waves may be generated in air or other gases. Sometimes it is advantageous to preheat the medium, before the shock waves are excited therein. In some cases it is suitable to use an inert gas or a reducing or neutral gas to avoid oxidation or other chemical changes in the solid material during the pulverization procedure. The density of energy required varies in accordance with the properties of the solid materials to be pulverized. The higher the density of energy is, the better is the pulverizing effect achieved. However, it should be mentioned that the size of the particles in the powder produced also depends on the frequency of the shock waves. The higher frequency, the smaller particles. And the higher the amplitude of the shock waves is, the smaller the particles produced will be.

In certain cases, the course of the pulverizing process in accordance with this invention seems to be that the great quantity of energy transferred from the shock waves to the material to be pulverized will at least locally and momentarily transform said material to a more or less liquid state, so that it is broken (split) up or disintegrated by the expansion waves (between the shock waves, which are compression waves). It seems that then in the particles (drops, grains) thus produced there is a balance between the accelerating force (explosive force) on the one hand, and the strength (surface tension) of the particle on the other hand. The size of the particle (drop, grain) seems to be determined by this balance condition to a substantial extent. As mentioned above, the frequency of the shock waves has a decisive influence upon the size of the particles, and this is probably due to the fact that the density of energy and thus the force accelerating the particles (drops or grains) increases with (the square of) the frequency.

The shock waves may be generated mechanically, electrically or magnetically.

As a rule, it is preferred to generate the shock waves by mechanical shock excitation (or relaxation). For this purpose a gas under high (supercritical) pressure may be used, which is caused to escape (flow out) at supercritical speed above the speed of sound, that is supersonic speed. In order to achieve a periodical course with a sufficiently high frequency, it is preferred to cause the gas jet (pressure wave) to generate ultrasonic audio waves (that is: sound waves with a frequency above the audible range, thus with at least 20,000 cycles per second) to release a secondary shock wave; this means that relaxation waves are released. The secondary shock waves then have the character of a series (a train) of pulses with a high density of energy sufficient for an efficient pulverization. This will be further explained later on, where a device in accordance with the invention will be described.

The material to be pulverized should in some cases be (locally) preheated or melted, particularly when metals are to be pulverized.

When not pulverization proper but a decomposition or disintegration of (say organic) materials is to be effected, the method according to the invention should be modified accordingly. For instance, when wood is to be decomposed for producing cellulose fibers, incrustations in the wood have to be broken up, and the density of energy should be modified to suit that purpose. Because the incrustations are brittle and the cellulose fibers are flexible and elastic the invention renders it possible to disintegrate the incrustations without spoiling the fibers.

Two embodiments of a device in accordance with the invention are illustrated in the annexed drawings.

FIG. 2 shows a detail in FIG. 1, on a larger scale;

FIG. 4 shows a modified embodiment in vertical section.

Figure 1:
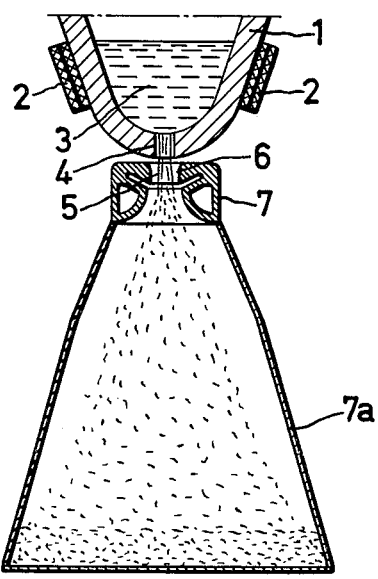
FIG. 1 shows a vertical section through a device according to the invention.

Referring now to FIG. 1 of the drawings, the crucible 1 is provided with an electric heating device 2 for melting the metal 3 (such as zinc or lead) introduced therein. Through a hole 4 in the bottom of the crucible 1 a jet 5 of molten metal flows which falls down into the central channel 6 of the shock wave generator 7. The pulverized metal is collected in a container 7a. The molten metal in the jet 5 is solid at ordinary room temperature, and likewise the pulverized metal in the container 7a is solid.

As is shown in FIG. 2, the shock wave generator is composed of three principal parts 8, 9, and 10, which are rigidly interconnected, for instance by means of screw threads 11, 12. The parts 8, 9 and 10 are substantially of an annular shape.

The element 8 is provided with the central channel 6 which may be coated with a fire-resistant (say ceramic) material. The element has one or more annular rows of small cavities or holes 13, which have bottoms. On each side of every cavity holes or recesses (cavities) 14 and 15 are provided for.

In the element 9 recesses (cavities) or holes 16, 17 are made facing the holes 14, and 15, respectively so that the cavities 14 and 16 togeher form a chamber and the cavities 15 and 17 together form another chamber; these chambers may be called reflectors and resonance cavities. A slot or gap 18 extends from the cavities 15, 17 beyond the holes 13 out into the central channel 6. Coaxially with each hole 13 an exhaust or jet hole 19 is arranged, and said holes 19 communicate with an annular pressure chamber 20 arranged in the elements 9 and 10. To said chamber a gas at high (supercritical) pressure (at least 0.9 atmospheres above atmospheric, but preferably 20 to 40 atmospheres above atmospheric) is supplied through a pipe 21.

The device described acts as follows:

When compressed air or other gas (such as hydrogen) is supplied through the pipe 21 and flows out through the holes 19, non-stationary shock waves are generated, which have a movable wave front and supersonic speed and ultrasonic frequency. Via the gap or slit 18 they are directed towards the centre line of the channel 6 and there strike the material 5 to be pulverized which is solid at room temperature. The shock waves have a very high energy and are concentrated on a small spot or zone so that a strong pulverizing effect is obtained, which as a rule causes a rapid heating too. The pulverized material falls down into the container 7a.

It has turned out that even if the solid material, for instance a metal, is heated to a glowing incandescent temperature during the pulverization, a very low percentage of oxide (such as 2 to 3%) is obtained in the pulverized material in the container 7a, in spite of the fact that the process is carried out in air (thus, not in a protective atmosphere).

The generation of the shock waves in the device shown has a complicated course. As far as it was possible to find out, it is effected somewhat as follows:

The generation is effected in three stages:

(1) Primary shock waves are generated, when the air (gas) escapes at supersonic speed (above the speed of sound) through the holes or nozzles 19.

(2) In the cavities 13 ultrasonic audio waves (having the speed of sound and a frequency above 20,000 cycles per second are also generated. However, the ultrasonic waves may also be generated separately).

(3) The primary shock wave which has an arched wave front and is instable in the gap 18, generates a secondary non-stationary shock wave with a movable wave front and a high contents of energy, under the influence of the ultrasonic audio wave. These secondary shock waves have the character of relaxation waves, which are released by the ultrasonic audio waves due to the conditions of instability. Thus, the secondary shock waves consist of a series of pulses with the same frequency as that of the generated ultrasonic audio waves. Perhaps it should be mentioned here that the relaxation waves may be defined as a periodical vibratory phenomenon with a steep wave front and with a relaxation or recovery period between two successive wave fronts or pulses.

The gas rushing out at supersonic speed through a hole 19 thus generates a shock wave front, which pendulates (surges) to and fro in relation to the mouth of the cavity 13. The shock wave front is unstable and thus acts as a reciprocating piston, which generates the non-stationary secondary shock wave (relaxation waves). The width of the gap 18 must be selected very carefully, so that the relaxation vibrations really are generated. This width must be dimensioned with regard, inter alia, to the Mach-number of the gas rushing out and is, as a rule, determined empirically, it being impossible to give an exact rule for calculating it.

The ultrasonic waves formed, which have the velocity of sound and a relatively low density of energy, are reflected in the chamber 15, 17 which forms a resonator for the ultrasonic audio waves. The secondary shock waves, which have a movable wave front and supersonic speed, and a very high density of energy, are probably to some extent reflected in the cavity 15, 17. These secondary shock waves formed in the gap 18 are partially deviated by the walls of the cavities 14, 16 and are directed towards and concentrated on the centre line of the channel 6.

Thus, said secondary non-stationary shock waves will get a configuration somewhat similar to a cone, having its down-wardly directed top (apex) substantially in the centre of the channel 6. The top angle of the cone varies permanently due to the vibrations of the primary shock wave front in the gap 18 and to reflections against the walls in the cavities 14 and 16. Thus, the secondary pulverizing shock wave cone will have the character of an umbrella, which is rhythmically opened (unfolded) and then closed (folded) again to a certain degree. The apex of the cone, that is the concentration point or spot of the shock waves, will, therefore, pendulate axially along the centre line (axis) of the channel 6, it will thus pendulate (move up and down) a distance along the rod or jet of the metal or material to be pulverized.

These pendulations or oscillations cause on (in) the metal or material pulses alternating with relaxation periods; thus the forces acting on (in) said material incessantly change their direction. These secondary non-stationary shock waves with high density of energy are only slightly reflected by the solid material, for instance metal, to be pulverized. Thus, they are absorbed by said material so that extremely rapid compression forces and expansion forces are generated therein rendering an extremely high pulverizing effect. This effect may be increased by pre-heating or melting the material, because then the transfer of energy from the shock wave to the material is increased still more.

The gas supplied through the pipe 21 may also be preheated.

The density of energy in shock waves increases with the square of the amplitude and with the square of the frequency, and this must be considered when dimensioning the device in accordance with the invention. Due consideration must also be taken to the pressure and character of the gas, the size, configuration and relative situation of the cavities, the width of the gap etc., the higher the pressure of the gas (and thus the amplitude of the shock waves) and the frequency is, the smaller is the particle size of the powder produced. The gas used (1) should not react with the material to be pulverized, to avoid the formation of undesirable products or strong heat; and (2) should be able to be compressed to the necessary pressure without inconvenience.

The number of nozzles and cavities should be as high as practically possible, and the radius of the pitch circle on which they are arranged should be small.

Figure 3:
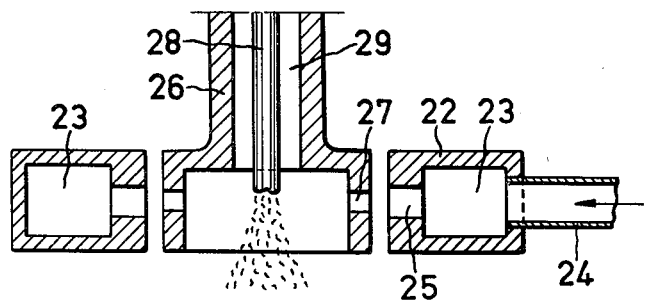
FIG. 3 shows a vertical section through a modified embodiment.

In the embodiment shown in FIG. 3, an annular element 22 has an annular chamber 23, to which compressed gas is supplied through one or more pipes 24. The compressed gas flows out through holes or nozzles 25 in direction to a rotating body 26 having holes 27. A rod 28 of metal or other solid material is fed into a central channel 29 in the body 26.

Also in this case non-stationary, supersonic shock waves with high density of energy are produced, which are concentrated on the rod 28 and pulverize it. These shock waves are concentrated on the same point or small spot (zone) on the solid material, but they are interrupted with ultrasonic frequency so that the necessary discontinuity is attained, and compression and expansion forces in a rapid sequence and with extremely high density of energy are generated. Also in this case the shock waves will get the character of a series of separate strokes or blows (pulses) which with extremely shock intervals are directed against a point, small spot or narrow zone on the solid material.

When dimensioning the device in accordance with the invention due regard must be taken to all essential factors, so that a shock wave with a movable wave front is really obtained, which is concentrated (converges) towards a centre and has a sufficiently high frequency, such as 40,000 to 100,000 vibrations per second. In one embodiment of the invention, a gas pressure of 30 atmospheres above atmospheric and 80,000 vibrations per second were used, but the invention is obviously not limited to these figures. High frequency and high gas pressure result in a powder with small particles.

As shown in FIG. 2 the diameter of the hole 13 may be made somewhat smaller than the diameter of the holes 19. On the other hand, the holes 25 may have a greater diameter than that of the holes 27, as illustrated in FIG. 3.

In some cases parallel slits may be substituted for the holes. An example is shown in FIG. 4 which is similar to FIG. 2.

According to FIG. 4 the compressed gas from the chamber 20 is blown out through an annular slit 30 against an edge 31 which is annular and forms one edge of a toroid-shaped or annular resonator chamber 32. Just opposite said resonator chamber and facing it there is a second resonator chamber 33 also toroid-shaped or annular. These two resonator chambers also act as reflectors or deviators and in the gap or slot 34 between them supersonic, non-stationary shock waves with ultrasonic, frequency are generated which are directed to and concentrated on a small spot on the material to be pulverized. In other respects FIG. 4 is quite analogous to FIG. 2 and corresponding parts carry the same reference characters.

What we claim is:

1. An apparatus for decomposing and pulverizing materials, which are solid at room temperature, comprising, in combination, a chamber, means for supplying gas at supercritical pressure (above 0.9 kg./cm.$^2$ above atmospheric) to said chamber, at least one ring of nozzles from said chamber, shallow relaxation holes coaxial with and facing said nozzles, resonator cavities on both sides of said nozzles, slots between the mouths of said nozzles and the facing edges of said relaxation holes, said slots being directed concentrically inwards to a small spot on the central axis of the ring, and means for feeding the solid material into said spot.

2. An apparatus for decomposing and pulverizing materials, which are solid at room temperature, comprising, in combination, a chamber, means for supplying gas at supercritical pressure (above 0.9 kg./cm.$^2$ above atmospheric) to said chamber, at least one ring of nozzles from said chamber, shallow relaxation holes facing said nozzles, said relaxation holes being produced in a rotatable hollow body, said holes being directed concentrically inwards and extend through said body to the center of the cavity thereof, means for rotating said body at very high speed, and means for feeding the solid material into the center of the cavity of said body.

3. An apparatus for decomposing and pulverizing materials, which are solid at room temperature, comprising, in combination, a chamber, means for supplying gas at supercritical pressure (above 0.9 kg./cm.$^2$ above atmospheric) to said chamber, at least one ring of nozzles from said chamber, shallow relaxation holes coaxial with and permanently facing said nozzles, resonator and reflecting cavities on both sides of said nozzles, slots between the mouths of the nozzles and the facing edges of said relaxation holes, said slots having a width adapted to render an unstable primary shock wave in cooperation with said nozzles and cavities, while said slots are also directed concentrically inwards to a small zone on the central axis of the ring, and means for feeding the solid material into said zone.

4. An apparatus as claimed in claim 3, wherein said slots form together a truncated cone, whose virtual apex is in said zone.

5. An apparatus for decomposing and pulverizing materials, which are solid at ordinary room temperature, comprising, in combination, a chamber, at least one nozzle slit from said chamber, means for supplying gas at a pressure of at least one atmosphere (above atmospheric) to said chamber, at least one toroid-shaped relaxation cavity facing said nozzle slit across a narrow slot, at least one toroid-shaped resonator cavity encircling said nozzle slit and said relaxation cavity, the slot between the mouth of said nozzle slit and the facing edges of said resonator cavity opening inwards all around to a small spot on the central axis of the apparatus, and means for feeding the solid material into said spot on the central axis to receive the non-stationary shock waves with a movable wave front and ultrasonic frequency emitted concentrically inwards at supersonic speed from said slot.

6. The method of pulverizing materials which are solid at room temperature which comprises generating a sequence of wave fronts, each of said wave fronts being initially on generation composed of compressional waves in the form of shock waves which remain in that form thereafter, causing said shock wave fronts to impinge in sequence onto a small area of said material, said shock wave fronts being composed of compressional waves having an ultrasonic frequency and advancing at a supersonic rate and being adapted to produce alternately compressive and expansive forces in said material to cause disintegration thereof.

7. The method set forth in claim 6 in which said compressional waves have a frequency above 20,000 cycles per second.

8. The method set forth in claim 6 in which said compressional waves have a frequency between 40,000 and 100,000 cycles per second.

9. The method of pulverizing materials which are solid at room temperature which comprises generating a sequence of annular wave fronts, each of said wave fronts being initially on generation composed of compressional waves in the form of shock waves which remain in that form thereafter, said shock wave fronts being composed of compressional waves having an ultrasonic frequency and advancing radially into a concentrated zone at a supersonic rate and subjecting said material in said zone to said wave fronts to produce thereon alternate compressive and expansive forces adapted to cause disintegration thereof.

10. The method of pulverizing materials which are solid at room temperature which comprises generating a sequence of continuous annular wave fronts, said wave fronts being composed of compressional waves having an ultrasonic frequency and advancing radially without reflection into a concentrated zone at a supersonic rate and subjecting said material in said zone to said wave fronts to produce thereon alternate compressive and expansive forces adapted to cause disintegration thereof.

References Cited in the file of this patent

UNITED STATES PATENTS

| | | |
|---|---|---|
| 2,163,649 | Weaver | June 27, 1939 |
| 2,384,892 | Comstock | Sept. 18, 1945 |
| 2,462,554 | Robinson | Feb. 22, 1949 |
| 2,510,574 | Grenhalgh | June 6, 1950 |
| 2,617,874 | Lewis | Nov. 11, 1952 |
| 2,636,219 | Beamer et al. | Apr. 26, 1953 |
| 2,738,172 | Spies et al. | Mar. 13, 1956 |
| 2,832,545 | Segraves | Apr. 29, 1958 |
| 2,889,580 | Wald et al. | June 9, 1959 |
| 2,980,345 | Kececioglu et al. | Apr. 18, 1961 |